United States Patent
Kanemitsu et al.

(10) Patent No.: US 9,237,282 B2
(45) Date of Patent: Jan. 12, 2016

(54) SOLID-STATE IMAGING DEVICE AND CAMERA MODULE INCLUDING AD CONVERTING UNITS FOR RESPECTIVE PIXELS

(71) Applicant: Kabushiki Kaisha Toshiba, Minato-ku (JP)

(72) Inventors: Shiroshi Kanemitsu, Kanagawa (JP); Atsuhiko Nunokawa, Kanagawa (JP); Kazuhide Sugiura, Kanagawa (JP); Miho Iizuka, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 40 days.

(21) Appl. No.: 13/938,382

(22) Filed: Jul. 10, 2013

(65) Prior Publication Data
US 2014/0218577 A1     Aug. 7, 2014

(30) Foreign Application Priority Data
Feb. 1, 2013    (JP) .................................. 2013-018695

(51) Int. Cl.
*H04N 5/355*    (2011.01)
*H04N 5/347*    (2011.01)
*H04N 5/374*    (2011.01)

(52) U.S. Cl.
CPC .......... *H04N 5/35563* (2013.01); *H04N 5/347* (2013.01); *H04N 5/3742* (2013.01)

(58) Field of Classification Search
CPC ................................................ H04N 5/35563
See application file for complete search history.

(56) References Cited

U.S. PATENT DOCUMENTS

| | | | |
|---|---|---|---|
| 7,565,033 B2* | 7/2009 | Hanson et al. | 382/304 |
| 7,800,674 B2* | 9/2010 | Gomi et al. | 348/308 |
| 8,089,530 B2 | 1/2012 | Mabuchi | |
| 8,576,299 B2* | 11/2013 | Mabuchi | 348/230.1 |
| 2010/0013969 A1* | 1/2010 | Ui | 348/294 |
| 2011/0032403 A1 | 2/2011 | Mabuchi | |
| 2012/0113290 A1* | 5/2012 | Nakata et al. | 348/222.1 |

FOREIGN PATENT DOCUMENTS

| | | |
|---|---|---|
| JP | 8-340486 | 12/1996 |
| JP | 2008-167004 | 7/2008 |
| JP | 2010-28423 | 2/2010 |
| JP | 2011-40926 | 2/2011 |
| JP | 2011-199781 | 10/2011 |
| JP | 2012-104979 | 5/2012 |

* cited by examiner

*Primary Examiner* — Albert Cutler
(74) *Attorney, Agent, or Firm* — Oblon, McClelland, Maier & Neustadt, L.L.P.

(57) ABSTRACT

According to one embodiment, a solid-state imaging device includes a pixel array and AD converting unit. In the AD converting unit, a plurality of AD converts are arranged in a horizontal direction. The pixel is configured by a small pixel group. The small pixel group is formed of a plurality of small pixels. The plurality of small pixels read out the signal charges. The small pixel group includes two or more small pixels having different optical sensitivities. The solid-state imaging device includes N AD converting units. N is the number of small pixel groups which are arranged in a vertical direction at every small pixel. N is an integer of 2 or higher.

13 Claims, 10 Drawing Sheets

SOLID-STATE IMAGING DEVICE AND CAMERA MODULE INCLUDING AD CONVERTING UNITS FOR RESPECTIVE PIXELS

CROSS-REFERENCE TO RELATED APPLICATIONS

This application is based upon and claims the benefit of priority from Japanese Patent Application No. 2013-018695, filed on Feb. 1, 2013; the entire contents of all of which are incorporated herein by reference.

FIELD

Embodiments described herein relate generally to a solid-state imaging device and a camera module.

BACKGROUND

In recent years, in a solid-state imaging device, the dynamic range of pixels is narrowed due to increase of the number of the pixels and miniaturization of a pixel. The output of the solid-state imaging device is easily saturated in charges depending on an amount of light incident on a portion having a high brightness of an object. Examples of a countermeasure against the output saturation in charges may include reduction of the output gain, shortening of a charge accumulation time, and the like. In this case, the output saturation in charges can be reduced in the portion having a high brightness; on the other hand, it is difficult to obtain an optimal output in a portion having a low brightness.

High dynamic range (HDR) synthesis is known as an image capturing technique for representing a wider dynamic range than that of a general image capturing method. As an HDR synthesis method, for example, the charge accumulation time and the output gain are differently set in each of horizontal lines in which pixels are arranged in parallel in a horizontal direction. According to this method, a resolution in a vertical direction is substantially decreased by half as compared with a general image capturing method so that the resolution is lowered.

Further, as another HDR synthesis method, for example, two or more images which are obtained by differently setting the charge accumulation time and the output gain are synthesized. According to this method, delay occurs in a frame rate of a synthetic image with respect to an output cycle by an image sensor. Therefore, specifically, when a moving image is captured, object image shake (motion blurring) easily occurs. Further, a frame memory which synchronizes a frame timing for a plurality of images is required so that the size of a circuit is increased, which causes the increase of costs and the increase of power consumption.

As for such a problem, for example, the solid-state imaging device may be taken measures such that a general one pixel is configured as a small pixel group formed of a plurality of small pixels. A small pixel suitable for an optimal output is selected in a signal processing from the small pixel group including a plurality of small pixels having different optical sensitivities and the selected pixel is used for the output. In this method, as compared with a general case where signal charges for every pixel are read, the amount of signals read out from a pixel array is increased so that it is difficult to readout the signal charges at a high speed. In the solid-state imaging device, it is difficult to read out the signal charges from the pixel array at a high speed so that the frame rate is lowered.

DETAILED DESCRIPTION

In general, according to an embodiment, a solid-state imaging device includes a pixel array and an AD converting unit. The pixel array includes a plurality of pixels which are arranged in a horizontal direction and a vertical direction. The pixel array generates signal charges in accordance with an amount of incident light onto each of the pixels. The AD converting unit includes an AD converter. The AD converter converts an analog signal read out from the pixel into a digital signal. In the AD converting unit, a plurality of AD converts are arranged in a horizontal direction. The pixel is configured as a small pixel group. The small pixel group is formed of a plurality of small pixels. The plurality of small pixels are capable of reading out the signal charges. The small pixel group includes two or more small pixels having different optical sensitivities. The solid-state imaging device includes N AD converting units. N is the number of small pixels which are arranged in a vertical direction in every small pixel group. N is an integer of 2 or higher.

Exemplary embodiments of a solid-state imaging device and a camera module will be explained below in detail with reference to the accompanying drawings. The present invention is not limited to the following embodiments.

Figure 1:
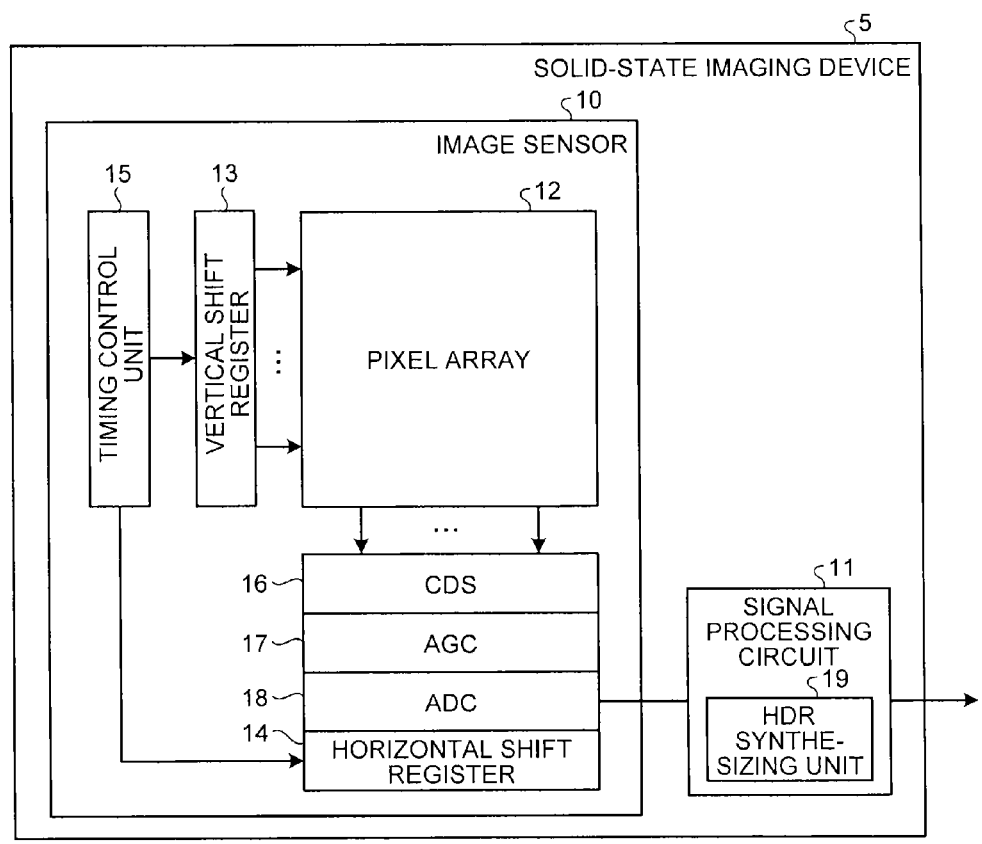
FIG. 1 is a block diagram illustrating a schematic configuration of a solid-state imaging device according to a first embodiment.
Figure 2:
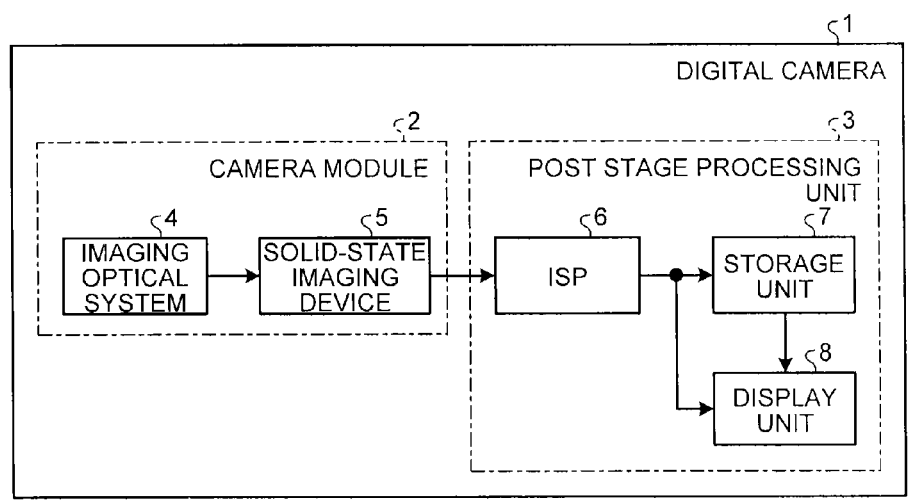
FIG. 2 is a block diagram illustrating a schematic configuration of a digital camera which includes the solid-state imaging device illustrated in FIG. 1.

FIG. 1 is a block diagram illustrating a schematic configuration of a solid-state imaging device according to a first embodiment. FIG. 2 is a block diagram illustrating a schematic configuration of a digital camera which includes the solid-state imaging device illustrated in FIG. 1.

A digital camera 1 includes a camera module 2 and a back stage processing unit 3. The camera module 2 includes an imaging optical system 4 and a solid-state imaging device 5. The post stage processing unit 3 includes an image signal processor (ISP) 6, a storage unit 7, and a display unit 8. The camera module 2 is applied not only to the digital camera 1 but also to, for example, an electronic device such as a camera-attached portable terminal.

The imaging optical system 4 captures light from an object and forms an object image. The solid-state imaging device 5 captures the object image. The ISP 6 performs a signal processing on an image signal obtained by capturing an image by the solid-state imaging device 5. The storage unit 7 stores the image to which the signal processing by the ISP 6 is subjected. The storage unit 7 outputs the image signal to the display unit 8 in accordance with the manipulation of a user. The display unit 8 displays the image in accordance with the image signal input from the ISP 6 or the storage unit 7. The display unit 8 is, for example, a liquid crystal display.

The solid-state imaging device 5 includes an image sensor 10 and a signal processing circuit 11. The image sensor 10 is, for example, a CMOS (complementary metal oxide semiconductor) image sensor. The image sensor 10 includes a pixel array 12, a vertical shift register 13, a horizontal shift register 14, a timing control unit 15, a correlated double sampling unit (CDS) 16, an automatic gain control unit (AGC) 17, and an analog to digital converting unit (ADC) 18.

The pixel array 12 is provided in an imaging region of the image sensor 10. The pixel array 12 is formed of a plurality of pixels which are disposed in a horizontal direction (a row direction) and a vertical direction (a column direction) as an array shape. Each pixel includes a photodiode which is a photoelectric conversion element. The pixel array 12 generates signal charges in accordance with the amount of incident light onto each of the pixels.

Figure 3:
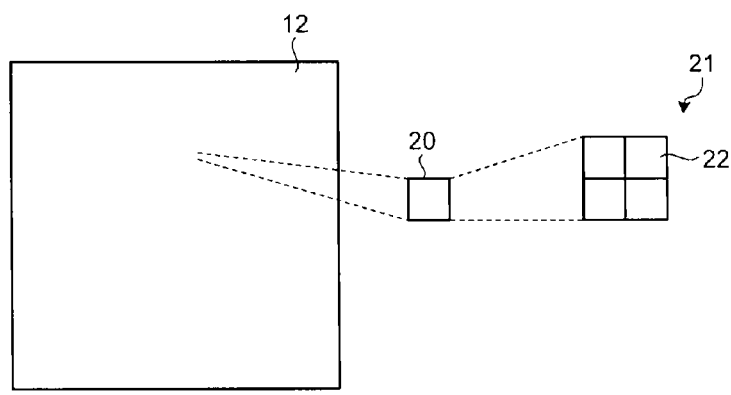
FIG. 3 is a diagram illustrating a pixel array, a pixel, and a small pixel.

FIG. 3 is a diagram illustrating a pixel array, a pixel, and a small pixel. The pixels 20 form a small pixel group 21. The small pixel group 21 is formed of four small pixels 22. In each of the small pixel groups 21, two small pixels 22 are disposed in the horizontal direction and two small pixels 22 are disposed in the vertical direction to form a matrix. Each small pixel 22 is configured to be capable of reading out the signal charges. The small pixel group 21 includes two or more small pixels 22 having different optical sensitivities.

The timing control unit 15 supplies a timing signal which indicates a timing of reading out the signal from each of the small pixels 22 of the pixel array 12 to the vertical shift register 13 and the horizontal shift register 14. The vertical shift register 13 selects the small pixels 22 in the pixel array 12 for every row, in accordance with the timing signal from the timing control unit 15. The vertical shift register 13 outputs a read-out signal to the small pixel 22 of the selected row.

The small pixel 22 to which the read-out signal from the vertical shift register 13 is input outputs signal charges which are accumulated in accordance with the amount of incident light. The pixel array 12 outputs a signal from the small pixel 22 to the CDS 16 via a vertical signal line. The vertical shift register 13 functions as a row selecting circuit which selects a row reading the signal charges, among the pixel array 12.

The CDS 16 performs a correlated double sampling processing on a signal from the pixel array 12, in order to reduce a fixed pattern noise. The AGC 17 amplifies a signal to which the correlated double sampling processing by the CDS 16 is subjected. The ADC 18 converts a signal which is amplified in the AGC 17 from an analog method into the digital method. The horizontal shift register 14 sequentially reads out the signal which is converted into a digital method in the ADC 18 in accordance with the timing signal from the timing control unit 15.

The signal processing circuit 11 performs various signal processings on a digital image signal which is read out by the horizontal shift register 14. The signal processing circuit 11 includes a high dynamic range (HDR) synthesizing unit 19. The HDR synthesizing unit 19 performs HDR synthesis on the digital image signal which is input to the signal processing circuit 11. The signal processing circuit 11 performs other signal processings such as defect correction, noise reduction, shading correction, or white balance adjustment, in addition to the HDR synthesis by the HDR synthesizing unit 19. The solid-state imaging device 5 outputs the digital image signal to which the signal processing by the signal processing circuit 11 is subjected.

Figure 4:
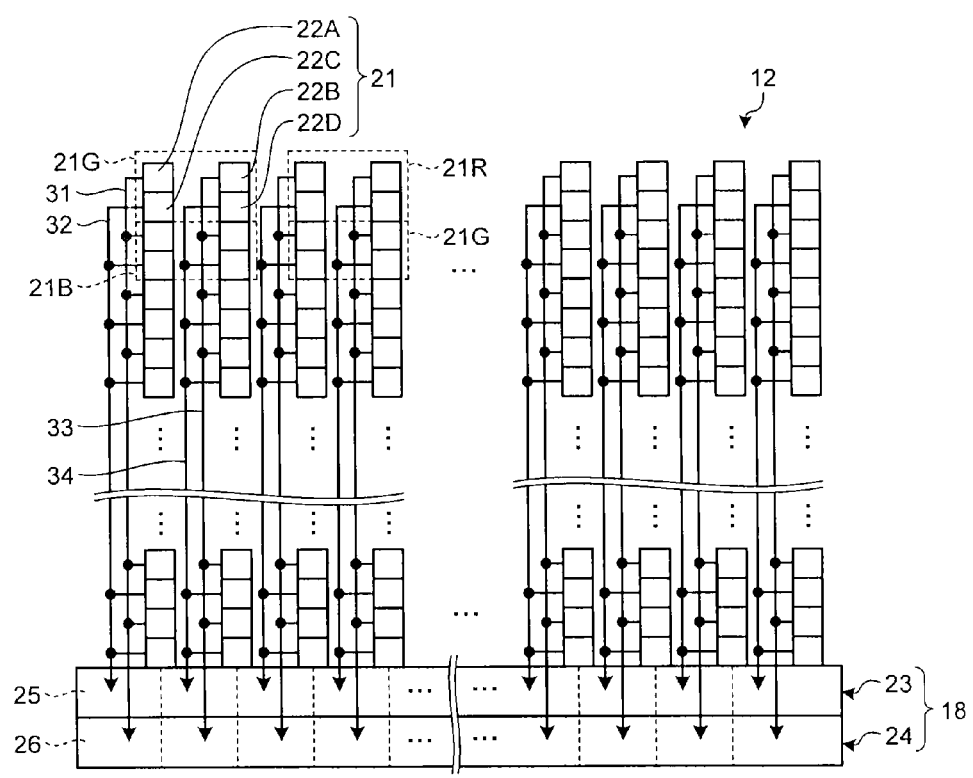
FIG. 4 is a schematic diagram illustrating an ADC and small pixels which are arranged in a pixel array.

FIG. 4 is a schematic diagram illustrating an ADC and small pixels which are arranged in a pixel array. In the pixel array 12, for example, a small pixel group 21R which detects red (R) light, a small pixel group 21G which detects green (G) light, and a small pixel group 21B which detects blue (B) light form a Bayer array.

Four small pixels 22A, 22B, 22C, and 22D which form the small pixel group 21 are configured so as to have different optical sensitivities, each other. In this embodiment, among the four small pixels 22A, 22B, 22C, and 22D, the small pixel 22A has the highest optical sensitivity. After the small pixel 22A, the optical sensitivities are decreased in the order of the small pixels 22B, 22C, and 22D.

In this embodiment, the small pixel 22A indicates a small pixel which is located in an upper left portion of each of the small pixel groups 21. The small pixels 22A on the same column are connected to a common vertical signal line 31. The small pixel 22C indicates a small pixel which is located in a lower left portion of each of the small pixel groups 21. The small pixels 22C on the same column are connected to a common vertical signal line 32.

The small pixel 22B indicates a small pixel which is located in an upper right portion of each of the small pixel groups 21. The small pixels 22B on the same column are connected to a common vertical signal line 33. The small pixel 22D indicates a small pixel which is located in a lower right portion of each of the small pixel groups 21. The small pixels 22D on the same column are connected to a common vertical signal line 34. The arrangement of the small pixels 22A, 22B, 22C, and 22D having different optical sensitivities is not limited to an arrangement of the present embodiment, but may be arbitrarily determined.

Sensitivity for optical detection of the pixel array 12 varies, for example, by making a light receiving area different. For example, the four small pixels 22A, 22B, 22C, and 22D have openings, through which incident light passes, on a light receiving surface. In this embodiment, among the four small pixels 22A, 22B, 22C, and 22D, the small pixel 22A has the largest opening area. After the small pixel 22A, the areas of the openings are decreased in the order of the small pixels 22B, 22C, and 22D.

Further, the solid-state imaging device 5 is not limited to a case when the optical sensitivity of each of the small pixels 22 varies depending on the light receiving area. The solid-state imaging device 5 may vary the optical sensitivity of each of the small pixels 22, for example, in accordance with an electronic shutter time or an analog gain, in addition to the light receiving area. The solid-state imaging device 5 may adjust the optical sensitivity of each of the small pixels 22 by combination of at least two of the light receiving area, the electronic shutter time, and the analog gain.

Figure 5:
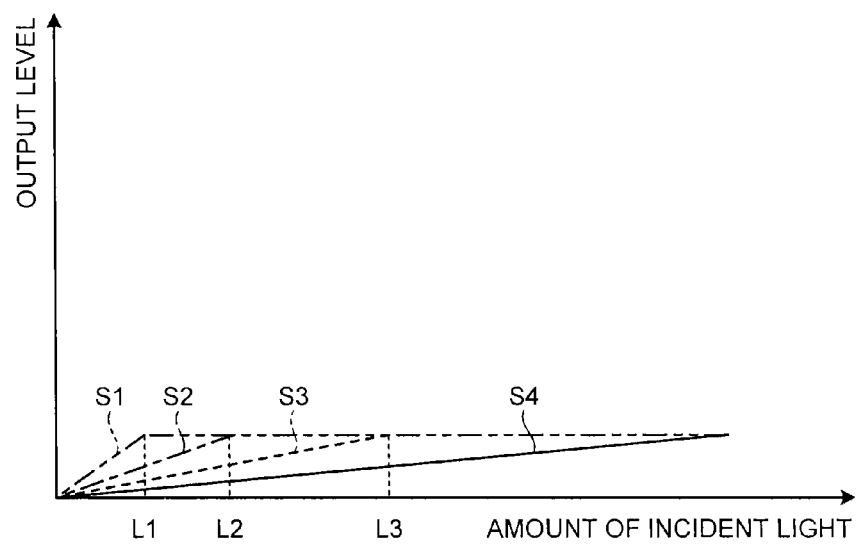
FIGS. 5 and 6 are diagrams illustrating HDR synthesis by an HDR synthesizing unit.
Figure 6:
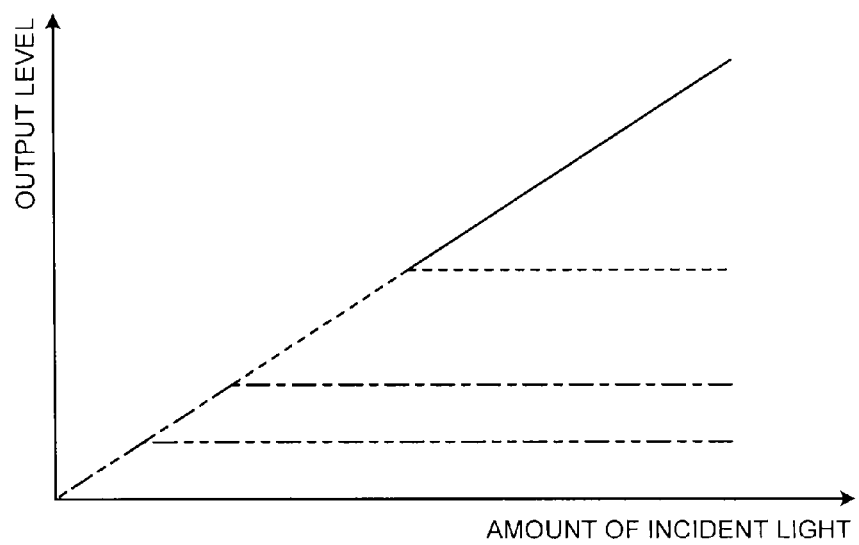

FIGS. 5 and 6 are diagrams illustrating the HDR synthesis by the HDR synthesizing unit 19. In graphs illustrated in FIGS. 5 and 6, a vertical axis represents an output level and a horizontal axis represents the amount of incident light. If the amount of incident light of the small pixel 22A is a predetermined saturated light quantity $L1$, signal charges generated in the small pixel 22A reach a storage capacitance of a photodiode. As illustrated in FIG. 5, if the amount of incident light is larger than the saturated light quantity $L1$, the output charge of the small pixel 22A is saturated so that an output level of a signal $S1$ from the small pixel 22A becomes constant.

If the amount of incident light of the small pixel 22B is a predetermined saturated light quantity L2 (L2>L1), signal charges generated in the small pixel 22B reach a storage capacitance of a photodiode. If the amount of incident light is larger than the saturated light quantity L2, the output charge of the small pixel 22B is saturated so that an output level of a signal S2 from the small pixel 22B becomes constant.

If the amount of incident light of the small pixel 22C is a predetermined saturated light quantity L3 (L3>L2), signal charges generated in the small pixel 22C reach a storage capacitance of a photodiode. If the amount of incident light is larger than the saturated light quantity L3, the output charge of the small pixel 22C is saturated so that an output level of a signal S3 from the small pixel 22C becomes constant. Even when the amount of incident light is larger than the saturated light quantity L3 of the small pixel 220, an output level of a signal S4 from the small pixel 22D is increased in proportion to the increase of the amount of incident light.

When the amount of incident light is larger than L1 and equal to or smaller than L2, the HDR synthesizing unit 19 performs the HDR synthesis by adding S1 and S2. When the HDR synthesis is performed, the HDR synthesizing unit 19 multiplies S2 by a predetermined gain M1 in order to match the output level of the small pixel 22B with the output level of the small pixel 22A.

When the amount of incident light is larger than L2 and equal to or smaller than L3, the HDR synthesizing unit 19 performs the HDR synthesis by adding S1, S2, and S3. When the HDR synthesis is performed, the HDR synthesizing unit 19 multiplies S2 by gain M1 and multiplies S3 by gain M2 (M2>M1), respectively, in order to match the output levels of the small pixel 22B and the small pixel 22C with the output level of the small pixel 22A.

When the amount of incident light is larger than L3, the HDR synthesizing unit 19 performs the HDR synthesis by adding S1, S2, S3, and S4. When the HDR synthesis is performed, the HDR synthesizing unit 19 multiplies S2 by gain M1, S3 by gain M2, and S4 by gain M3 (M3>M2>M1), respectively, in order to match the output levels of the small pixel 22B, the small pixel 22C, and the small pixel 22D with the output level of the small pixel 22A. By doing this, the HDR synthesizing unit 19 obtains an HDR synthesis signal. Further, when the amount of incident light is equal to or smaller than L1, the HDR synthesizing unit 19 outputs S1 without performing the HDR synthesis.

The solid-state imaging device 5 may capture an image with a wide dynamic range by the HDR synthesis by the HDR synthesizing unit 19. By reducing both insufficient exposure in a portion having a low brightness of the object and excessive exposure in a portion having a high brightness, the solid-state imaging device 5 may obtain a high quality image. By performing the HDR synthesis which uses the small pixel 22, the solid-state imaging device 5 may obtain a synthetic image having a resolution which is equal to that of a pixel 20 in the pixel array 12.

The ADC 18 includes two AD converting units 23 and 24. In the AD converting unit 23, a plurality of AD converts 25 are arranged in a horizontal direction. The AD converter 25 converts an analog signal read out from the small pixel 22 into a digital signal. In the AD converting unit 23, the AD converter 25 which is connected to the vertical signal line 32 and the AD converter 25 which is connected to the vertical signal line 34 are alternately arranged in a horizontal direction.

In the AD converting unit 24, a plurality of AD converters 26 are arranged in a horizontal direction. The AD converter 26 converts an analog signal read out from the small pixel 22 into a digital signal. In the AD converting unit 24, the AD converter 26 which is connected to the vertical signal line 31 and the AD converter 26 which is connected to the vertical signal line 33 are alternately arranged in a horizontal direction.

The AD converters 25 and 26 compare an input voltage by the analog signal which is readout from the small pixel 22 with a reference voltage having a ramp waveform. When the comparison of the input voltage and the reference voltage starts, the AD converters 25 and 26 start counting a time. When the reference voltage which varies in accordance with the lapse of time exceeds the input voltage, the AD converters 25 and 26 stop counting. The AD converters 25 and 26 generate a digital signal based on a result of counting a time required to compare the input voltage by the analog signal with the reference voltage.

It is assumed that a number of small pixels 22 which are arranged in a vertical direction in each of the small pixel groups 21 is N (in this case, N is an integer of 2 or higher). In this embodiment, in each of the small pixel groups 21, two small pixels 22 are arranged in the vertical direction (N=2). The solid-state imaging device 5 includes two AD converting units 23 and 24.

The timing control unit 15 simultaneously supplies the timing signals for two rows of small pixels 22 to the vertical shift register 13. The vertical shift register 13 outputs a readout signal to each of two rows of small pixels 22, in accordance with the timing signal from the timing control unit 15. The solid-state imaging device 5 uses the two AD converting units 23 and 24 to read out the image signals for two rows at one time.

In the solid-state imaging device 5, AD converting units 23 and 24 as many as the number of rows of the small pixels 22 included in the small pixel group 21 are provided. The solid-state imaging device 5 simultaneously reads out the image signal in each row in each of the small pixel groups 21 so that a line memory which synchronizes the image signals in each row during the HDR synthesis is not required. Therefore, the solid-state imaging device 5 may achieve the reduction of the cost and low power consumption by reducing the circuit size.

The solid-state imaging device 5 provides a plurality of small pixels 22 in the pixel 20 so that the amount of signals which are read out from the pixel array 12 is increased as compared with a general case when the signal charges for every pixel 20 are read out. The solid-state imaging device 5 simultaneously reads out the image signal of each of the rows in each of the small pixel groups 21 so that the signal charges may be read out at a high speed.

Further, the number of small pixels 22 included in the small pixel group 21 is not limited to four. In the small pixel group 21, two or more small pixels 22 may be arranged in the vertical direction. The small pixels 22 included in the small pixel group 21 may be plural. The number of AD converting units is not limited to two and the number of AD converting units may be equal to the number of small pixels 22 which are arranged in the small pixel group 21 in the vertical direction.

The solid-state imaging device 5 may add signals output from any of a plurality of small pixels which form the small pixel group 21. In this case, the small pixels to be added may have the same optical sensitivity.

The solid-state imaging device 5, for example, adds a signal output from the small pixel 22A and a signal output from the small pixel 22D, among four small pixels 22A, 22B, 22C, and 22D which form the small pixel group 21. The signal processing circuit 11 adds the signals as described above. The solid-state imaging device 5 uses a signal obtained by adding the small pixels 22A and 22D as an image signal by optical detection with a high sensitivity to perform the HDR synthesis. Also in this case, the solid-state imaging device 5 may capture an image with a wide dynamic range by the HDR synthesis by the HDR synthesizing unit 19.

Figure 7:
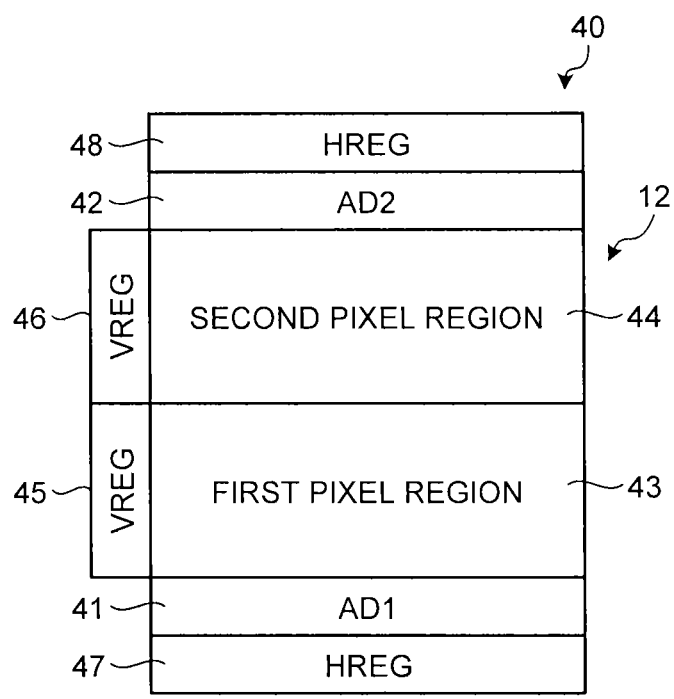
FIG. 7 is a schematic diagram illustrating a pixel array and components around the pixel array of a solid-state imaging device according to a second embodiment.
Figure 8:
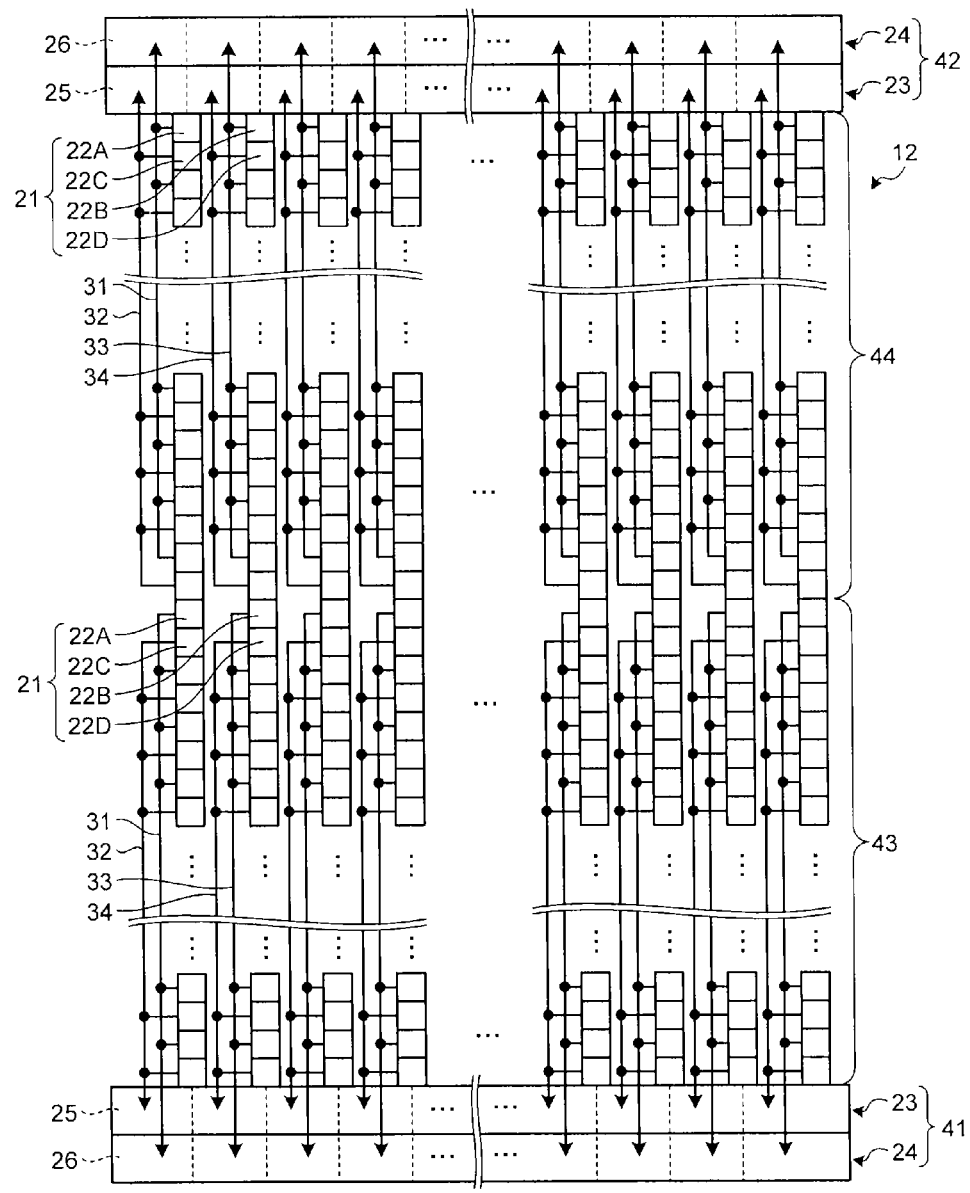
FIG. 8 is a schematic diagram illustrating an ADC and small pixels which are arranged in a pixel array.

FIG. 7 is a schematic diagram illustrating a pixel array and a component around the pixel array of a solid-state imaging device according to a second embodiment. FIG. 8 is a schematic diagram illustrating an ADC and small pixels which are arranged in a pixel array. A solid-state imaging device 40 according to this embodiment is applied to the camera module 2 (see FIG. 2) of the first embodiment. Same reference numerals are denoted to same parts as the first embodiment and redundant description will be appropriately avoided.

A pixel array 12 is divided into a first pixel region 43 and a second pixel region 44. The first pixel region 43 and the second pixel region 44 are adjacent to each other in a vertical direction. An analog-digital converting unit (ADC) includes a first AD converting unit group (AD1) 41 and a second AD converting unit group (AD2) 42. The first AD converting unit group 41 and the second AD converting unit group 42 are disposed in the vertical direction so as to face each other with the pixel array 12 interposed therebetween.

The first AD converting unit group 41 includes N AD converting units 23 and 24. The AD converting units 23 and 24 convert an analog signal from a small pixel group 21 included in the first pixel region 43 into a digital signal. The second AD converting unit group 42 includes N AD converting units 23 and 24. The AD converting units 23 and 24 convert an analog signal from a small pixel group 21 included in the second pixel region 44 into a digital signal. Similarly to the first embodiment, in the second embodiment, N=2.

A vertical shift register (VREG) 45 outputs a read-out signal to each of the small pixels 22 in the first pixel region 43 for every two rows in accordance with a timing signal from the timing control unit 15 (see FIG. 1). A horizontal shift register (HREG) 47 sequentially reads out the signal which is converted into a digital signal in the first AD converting unit group 41 in accordance with the timing signal from the timing control unit 15.

A vertical shift register (VREG) 46 outputs a read-out signal to each of the small pixels 22 in the second pixel region 44 for every two rows in accordance with a timing signal from the timing control unit 15 (see FIG. 1). A horizontal shift register (HREG) 48 sequentially reads out the signal which is converted into a digital signal in the second AD converting unit group 42 in accordance with the timing signal from the timing control unit 15.

The HDR synthesizing unit 19 (see FIG. 1) performs the HDR synthesis on both the digital image signal which is input from the horizontal shift register 47 to the signal processing circuit 11 and the digital image signal which is input from the horizontal shift register 48 to the signal processing circuit 11.

The solid-state imaging device 40 uses the two AD converting units 23 and 24 for each of the first pixel region 43 and the second pixel region 44 to read out the image signals for two rows at one time. Also in the second embodiment, similarly to the first embodiment, the solid-state imaging device 40 does not require a line memory which synchronizes the image signals of each row during the HDR synthesis. Therefore, the solid-state imaging device 40 may achieve the reduction of the cost and low power consumption by the reduction of the circuit size.

The solid-state imaging device 40 simultaneously reads out the image signal of each of the rows in each of the small pixel groups 21 so that the signal charges may be read out at a high speed. In the second embodiment, the solid-state imaging device 40 simultaneously operates the first AD converting unit group 41 and the second AD converting unit group 42 to read out the signal charges at a high speed.

Also in the second embodiment, similarly to the first embodiment, the small pixels 22 included in the small pixel group 21 may be plural. Each of the number of AD converting units included in the first AD converting unit group 41 and the number of AD converting units included in the second AD converting unit group 42 is not limited to two. The number of AD converting units included in the first AD converting unit group 41 and the number of AD converting units included in the second AD converting unit group 42 may be the same number of small pixels 22 which are arranged in the vertical direction in the small pixel group 21.

Figure 9:
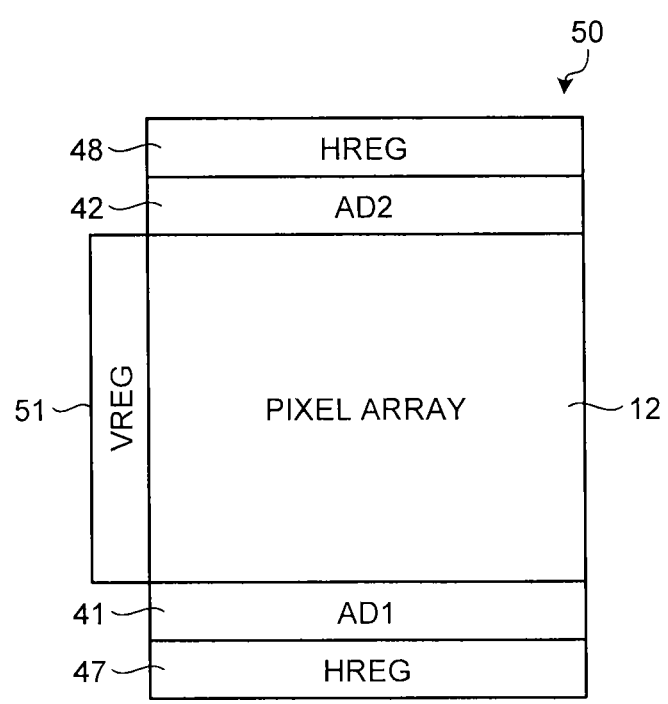
FIG. 9 is a schematic diagram illustrating a pixel array and components around the pixel array of a solid-state imaging device according to a third embodiment.
Figure 10:
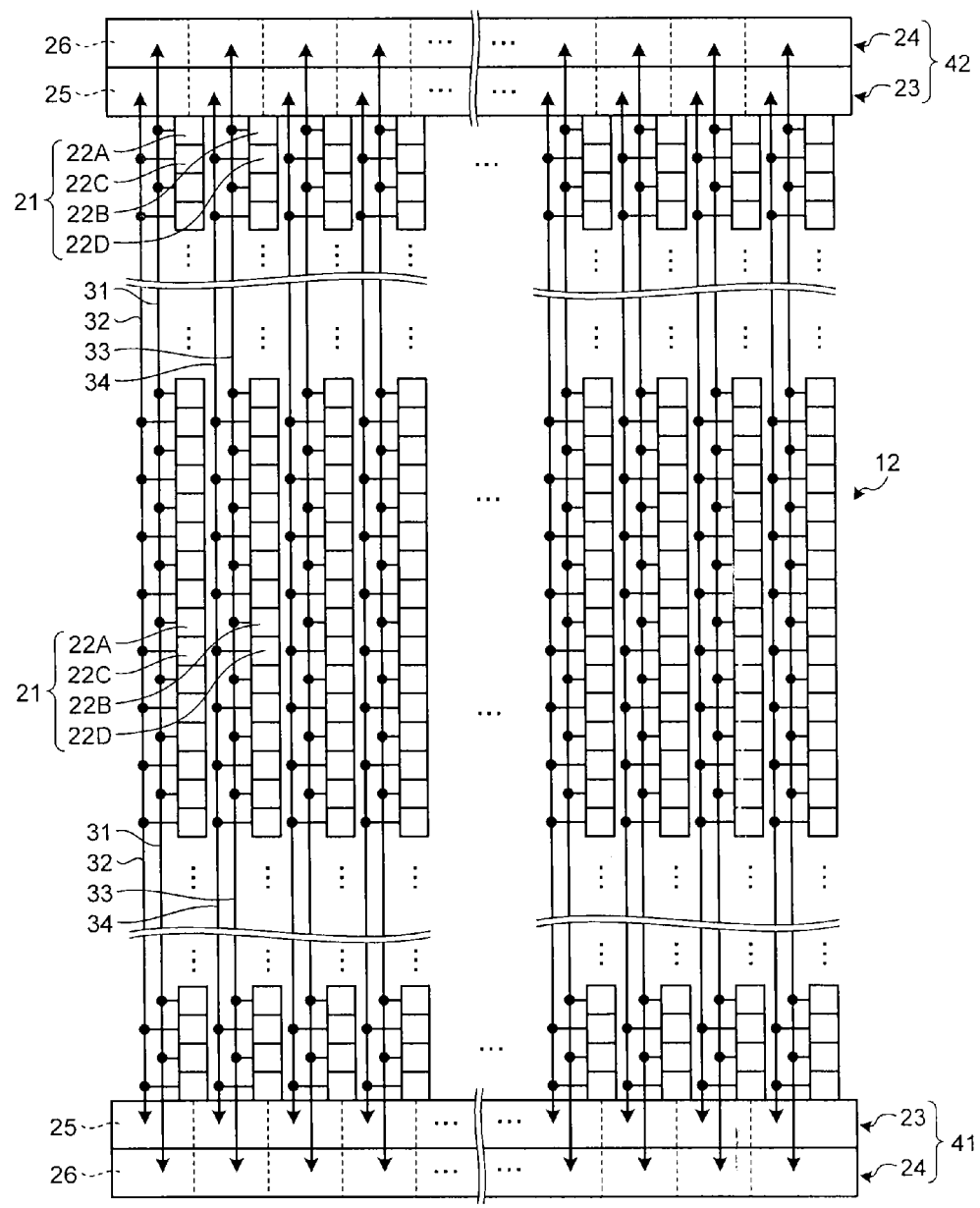
FIG. 10 is a schematic diagram illustrating an ADC and small pixels which are arranged in a pixel array.

FIG. 9 is a schematic diagram illustrating a pixel array and a component around the pixel array of a solid-state imaging device according to a third embodiment. FIG. 10 is a schematic diagram illustrating an ADC and small pixels which are arranged in a pixel array. A solid-state imaging device 50 according to this embodiment is applied to the camera module 2 (see FIG. 2) of the first embodiment. Same reference numerals are denoted to same parts as the first and second embodiments and redundant description will be appropriately avoided.

An analog-digital converting unit (ADC) includes a first AD converting unit group (AD1) 41 and a second AD converting unit group (AD2) 42. The first AD converting unit group 41 and the second AD converting unit group 42 are disposed in the vertical direction so as to face each other with the pixel array 12 interposed therebetween.

The first AD converting unit group 41 includes N AD converting units 23 and 24. The second AD converting unit group 42 includes N AD converting units 23 and 24. Similarly to the first and second embodiments, in the third embodiment, N=2.

The first AD converting unit group 41 and the second AD converting unit group 42 share the area of the pixel array 12 to perform the AD conversion. The range of a region where the first AD converting unit group 41 performs the AD conversion and the range of a region where the second AD converting unit group 42 performs the AD conversion may vary. The solid-state imaging device 50 may set a boundary of the region where the first AD converting unit group 41 performs the AD conversion and the region where the second AD converting unit group 42 performs the AD conversion in any position in the vertical direction in the pixel array 12.

The vertical shift register (VREG) 51 outputs a read-out signal in response of the sharing of the AD conversion by the first AD converting unit group 41 and the second AD converting unit group 42 to each small pixel 22 of the pixel array 12. The horizontal shift register (HREG) 47 sequentially reads out the signal which is converted into a digital signal in the first AD converting unit group 41 in accordance with the timing signal from the timing control unit 15.

The first AD converting unit group 41 reads out an analog signal from the small pixel group 21 for every two rows of small pixel 22. The first AD converting unit group 41 converts the read-out analog signal into a digital signal. The horizontal shift register (HREG) 47 sequentially reads out the signal which is converted into a digital signal in the first AD converting unit group 41 in accordance with the timing signal from the timing control unit 15.

The second AD converting unit group 42 reads out an analog signal from the small pixel group 21 for every two rows of small pixel 22. The second AD converting unit group 42 converts the read-out analog signal into a digital signal. A horizontal shift register (HREG) 48 sequentially reads out the signal which is converted into a digital signal in the second AD converting unit group 42 in accordance with the timing signal from the timing control unit 15.

The HDR synthesizing unit 19 (see FIG. 1) performs the HDR synthesis on both the digital image signal which is input from the horizontal shift register 47 to the signal processing circuit 11 and the digital image signal which is input from the horizontal shift register 48 to the signal processing circuit 11. Further, the solid-state imaging device 50 may perform the AD conversion for entire pixel array 12, on any one of the first AD converting unit group 41 and the second AD converting unit group 42.

The solid-state imaging device 50 may read the image signal for two rows in each of the first AD converting unit group 41 and the second AD converting unit group 42. Also in the third embodiment, similarly to the first embodiment, the solid-state imaging device 50 does not require a line memory which synchronizes the image signals of each row during the HDR synthesis. Therefore, the solid-state imaging device 50 may achieve the reduction of the cost and low power consumption by the reduction of the circuit size.

The solid-state imaging device 50 simultaneously reads out the image signal of each of the rows in each of the small pixel groups 21 so that the signal charges may be read out at a high speed. In the third embodiment, the solid-state imaging device 50 simultaneously operates the first AD converting unit group 41 and the second AD converting unit group 42 to read out the signal charges at a high speed.

The solid-state imaging device 50 may adjust the sharing of the AD conversion by the first AD converting unit group 41 and the second AD converting unit group 42, for example, in accordance with an image capturing scene. For example, in a scene which requires reading out the image signal at a high speed, the solid-state imaging device 50 divides the pixel array 12 by two to perform the AD conversion by the first AD converting unit group 41 and the second AD converting unit group 42.

For example, there may be slight fluctuation between a reference voltage which is applied to the AD conversion in the first AD converting unit group 41 and a reference voltage which is applied to the AD conversion in the second AD converting unit group 42. It is desirable to reduce an output difference due to the fluctuation of the reference voltages as much as possible. Further, when the image signal is read out at a high speed, the power consumption is increased, which causes the variation in the input voltage.

When the image signal is read out, if a higher value is placed on the precision rather than the speed, the solid-state imaging device 50 performs the AD conversion for entire pixel array 12 on any one of the first AD converting unit group 41 and the second AD converting unit group 42. By doing this, the solid-state imaging device 50 may improve the precision for reading out the image signal.

The solid-state imaging device 50 may adjust the sharing of the AD conversion by the first AD converting unit group 41 and the second AD converting unit group 42. The adjustment of the sharing of the AD conversion includes a case when any one of the first AD converting unit group 41 and the second AD converting unit group 42 performs the AD conversion for entire pixel array 12. By doing this, the solid-state imaging device 50 may capture an image signal which is suitable for an image capturing scene or a required image quality.

Also in the third embodiment, similarly to the first and second embodiments, it is desirable if the small pixels 22 included in the small pixel group 21 are plural. Each of the number of AD converting units included in the first AD converting unit group 41 and the number of AD converting units included in the second AD converting unit group 42 is not limited to two. The number of AD converting units included in the first AD converting unit group 41 and the number of AD converting units included in the second AD converting unit group 42 may be the same number of small pixels 22 which are arranged in the vertical direction in the small pixel group 21.

A solid-state imaging device according to the fourth embodiment performs exposure on each of small pixels plural times during the image capturing, and obtains a digital signal in which the results by the plural times of exposure are added. The solid-state imaging device according to this embodiment, for example, has the same configuration as the configuration illustrated in FIG. 4.

For example, when the exposure is performed two times in one image capturing, if the AD converters 25 and 26 count the time until the reference voltage exceeds the input voltage in the first exposure, the count value is stored without being reset. In the second exposure, the AD converters 25 and 26 count the time following the count value which is stored in the first exposure without being reset.

Figure 11:
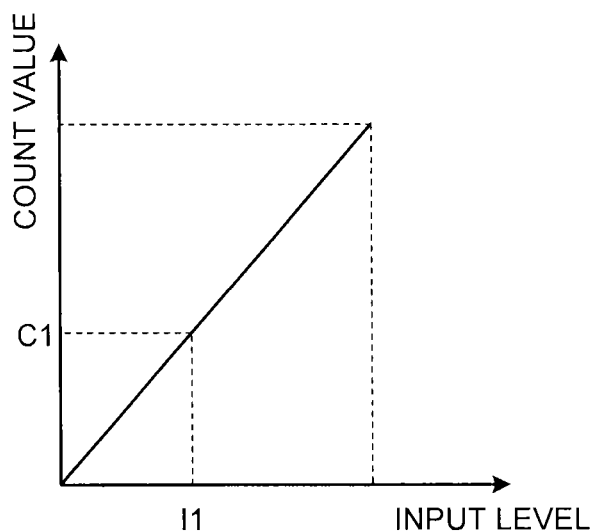
FIGS. 11 to 13 are diagrams illustrating addition of a plurality of exposure results.
Figure 12:
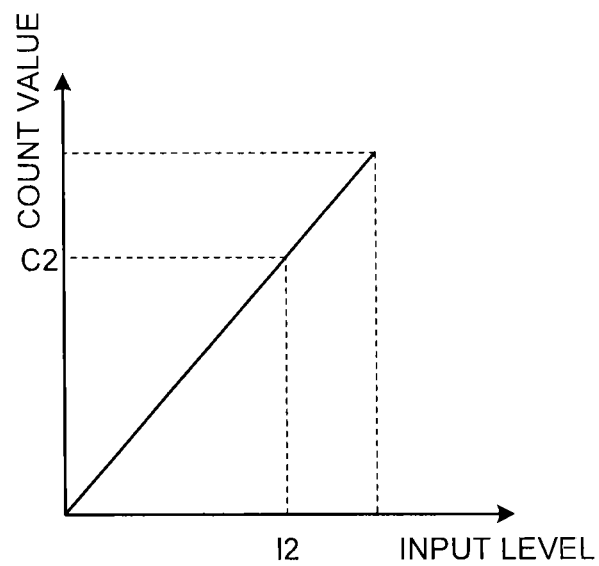
Figure 13:
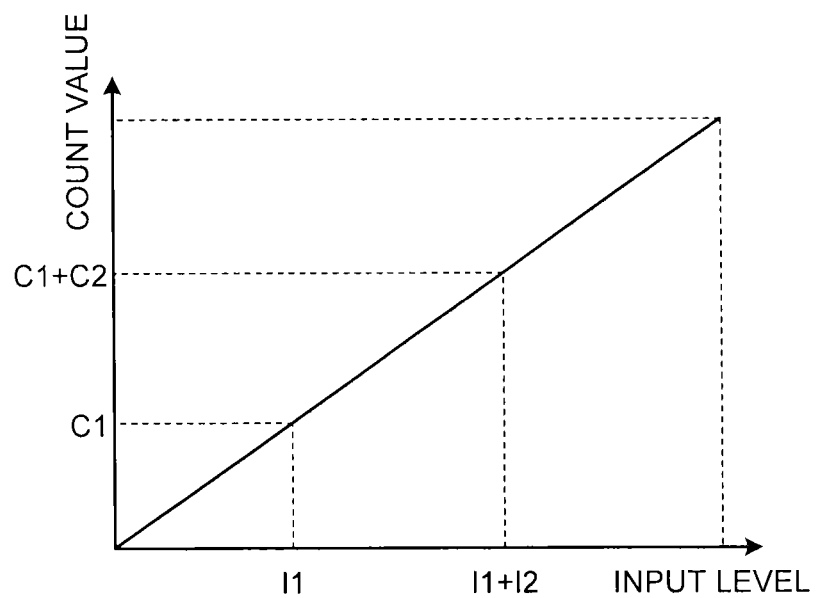

FIGS. 11 to 13 are diagrams illustrating addition of a plurality of exposure results. For example, as illustrated in FIG. 11, in the first exposure, the count value with respect to a signal level I1 input to the AD converters 25 and 26 is C1. Further, if the counting starts from zero in the second exposure, as illustrated in FIG. 12, the count value with respect to the signal level I2 which is input to the AD converters 25 and 26 is C2.

The AD converters 25 and 26 count the time by the second exposure, following the count value C1 in the first exposure to obtain the count value C1+C2. The count value C1+C2 corresponds to a sum I1+I2 of the signal levels input by two times of exposure.

Even when three or more times of exposure during the image capturing are performed, the AD converters 25 and 26 perform the addition, similarly to the case of two times of exposure. Therefore, in each of the exposures after the second exposure among a plurality of exposures, the AD converters 25 and 26 count the time continuously to the count value which is stored without being reset from the previous exposure. By doing this, the solid-state imaging device performs plural times of exposure during the image capturing and adds the signal levels which are the result of exposure.

For the plural times of exposure, for example, when the signal processing circuit 11 adds the digital signals, the signal processing circuit 11 needs a storage unit which stores a signal which is a result of exposure and an adding unit which adds the signals. For the plural times of exposure, the solid-state imaging device according to the fourth embodiment adds the results of the exposure by storing the count value in the AD converters 25 and 26 not to provide the storage unit and the adding unit. By doing this, the solid-state imaging device may have simple configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a pixel array which includes pixels arranged in a horizontal direction and a vertical direction and generates signal charges in accordance with an amount of incident light onto each of the pixels;
a first AD converting unit and a second AD converting unit which include AD converters arranged in a horizontal direction, each of the AD converters being configured to convert an analog signal read out from the pixels into a digital signal;
a first AD converting unit group including the first AD converting unit and the second AD converting unit; and
a second AD converting unit group including the first AD converting unit and the second AD converting unit and disposed in a vertical direction so as to face the first AD converting unit group with the pixel array interposed therebetween,
wherein each of the pixels includes four small pixels including two small pixels arranged in a horizontal direction in a first row and two small pixels arranged in a horizontal direction in a second row, the four small pixels including at least two small pixels having different optical sensitivities from each other,
the two small pixels in the first row are connected to AD converters in the first AD converting unit,
the two small pixels in the second row are connected to AD converters in the second AD converting unit,
the first AD converting unit group and the second AD converting unit group share a region of the pixel array to perform AD conversion, and
a range of the region where the first AD converting unit group performs the AD conversion and a range of the region where the second AD converting unit group performs the AD conversion vary.

2. The solid-state imaging device according to claim 1, wherein sharing of the AD conversion by the first AD converting unit group and the second AD converting unit group is adjustable including the cases that any one of the first AD converting unit group and the second AD converting unit group performs the AD conversion on the entire pixel array.

3. The solid-state imaging device according to claim 1, wherein each of the four small pixels includes an opening area, through which incident light passes, on a light receiving surface, and
small pixels having different optical sensitivities from each other have opening areas of different sizes from each other.

4. The solid-state imaging device according to claim 1, wherein the four small pixels have different optical sensitivities from each other.

5. The solid-state imaging device according to claim 1, wherein each of the four small pixels includes an opening area, through which incident light passes, on a light receiving surface, and
opening areas included in the four small pixels have different sizes from each other.

6. The solid-state imaging device according to claim 1, wherein the small pixels are arranged in a horizontal direction and a vertical direction in the pixel array,
small pixels in odd rows in the pixel array are connected to AD converters in the first AD converting unit, and
small pixels in even rows in the pixel array are connected to AD converters in the second AD converting unit, an odd row and an even row being adjacent to each other in a vertical direction.

7. A solid-state imaging device comprising:
a pixel array which includes pixels arranged in a horizontal direction and a vertical direction and generates signal charges in accordance with an amount of incident light onto each of the pixels; and
a first AD converting unit and a second AD converting unit which include AD converters arranged in a horizontal direction, each of the AD converters being configured to convert an analog signal read out from the pixels into a digital signal,
wherein each of the pixels includes four small pixels including two small pixels arranged in a horizontal direction in a first row and two small pixels arranged in a horizontal direction in a second row, the four small pixels including at least two small pixels having different optical sensitivities from each other,
the two small pixels in the first row are connected to AD converters in the first AD converting unit,
the two small pixels in the second row are connected to AD converters in the second AD converting unit,
the AD converters generate the digital signal based on a result of counting a time required to compare an input voltage by the analog signal with a reference voltage, and
when plural times of exposure are performed on the pixels during an image capturing, and the digital signal is obtained by adding the results of the plural times of exposure,
in each exposure after a second exposure, the AD converters count the time following a count value which is stored since a previous exposure without being reset.

8. The solid-state imaging device according to claim 7, wherein each of the four small pixels includes an opening area, through which incident light passes, on a light receiving surface, and
small pixels having different optical sensitivities from each other have opening areas of different sizes from each other.

9. The solid-state imaging device according to claim 7, wherein the four small pixels have different optical sensitivities from each other.

10. The solid-state imaging device according to claim 7, wherein each of the four small pixels includes an opening area, through which incident light passes, on a light receiving surface, and
opening areas included in the four small pixels have different sizes from each other.

11. The solid-state imaging device according to claim 7, wherein the small pixels are arranged in a horizontal direction and a vertical direction in the pixel array,
small pixels in odd rows in the pixel array are connected to AD converters in the first AD converting unit, and
small pixels in even rows in the pixel array are connected to AD converters in the second AD converting unit, an odd row and an even row being adjacent to each other in a vertical direction.

12. A camera module comprising:
an imaging optical system which captures light from an object and forms an object image; and
a solid-state imaging device which converts the light captured by the imaging optical system into signal charges and captures the object image,
wherein the solid-state imaging device includes:
a pixel array which includes pixels arranged in a horizontal direction and a vertical direction and generates the signal charges in accordance with an amount of incident light onto each of the pixels;

a first AD converting unit and a second AD converting unit which include AD converters arranged in a horizontal direction, each of the AD converters being configured to convert an analog signal read out from the pixels into a digital signal;

a first AD converting unit group including the first AD converting unit and the second AD converting unit; and a second AD converting unit group including the first AD converting unit and the second AD converting unit and disposed in the a vertical direction so as to face the first AD converting unit group with the pixel array interposed therebetween, wherein each of the pixels includes four small pixels including two small pixels arranged in a horizontal direction in a first row and two small pixels arranged in a horizontal direction in a second row, the four small pixels including at least two small pixels having different optical sensitivities from each other, the two small pixels in the first row are connected to AD converters in the first AD converting unit, the two small pixels in the second row are connected to AD converters in the second AD converting unit, the first AD converting unit group and the second AD converting unit group share a region of the pixel array to perform AD conversion, and a range of the region where the first AD converting unit group performs the AD conversion and a range of the region where the second AD converting unit group performs the AD conversion vary.

13. The camera module according to claim 12, wherein division of the AD conversion by the first AD converting unit group and the second AD converting unit group is adjustable including the cases that any one of the first AD converting unit group and the second AD converting unit group performs the AD conversion on the entire pixel array.

* * * * *